US008775075B2

(12) United States Patent  
Suzuki

(10) Patent No.: US 8,775,075 B2
(45) Date of Patent: Jul. 8, 2014

(54) TERMINAL DEVICE AND RECORDING MEDIUM

(75) Inventor: Hideo Suzuki, Setagaya-ku (JP)

(73) Assignee: Nec Casio Mobile Communications Ltd., Tokyo (JP)

( * ) Notice: Subject to any disclaimer, the term of this patent is extended or adjusted under 35 U.S.C. 154(b) by 1177 days.

(21) Appl. No.: 12/012,896

(22) Filed: Feb. 6, 2008

(65) Prior Publication Data

US 2008/0201069 A1 Aug. 21, 2008

(30) Foreign Application Priority Data

Feb. 19, 2007 (JP) ................................ 2007-037405

(51) Int. Cl.
*G08G 1/123* (2006.01)
*G06Q 10/08* (2012.01)
*G01C 21/20* (2006.01)

(52) U.S. Cl.
USPC ........... 701/465; 701/409; 701/410; 701/412; 701/468; 342/357.74; 340/988

(58) Field of Classification Search
USPC ......... 701/204, 208, 209, 213, 465, 409, 410, 701/412, 468; 455/456.4; 342/357.74; 340/988
See application file for complete search history.

(56) References Cited

U.S. PATENT DOCUMENTS

| | | | |
|---|---|---|---|
| 6,434,479 B1 * | 8/2002 | Kondou et al. ............... 701/203 |
| 6,975,941 B1 * | 12/2005 | Lau et al. ...................... 701/213 |
| 7,026,984 B1 * | 4/2006 | Thandu et al. ............ 342/357.74 |
| 7,359,713 B1 * | 4/2008 | Tiwari ...................... 455/456.1 |
| 7,577,516 B2 * | 8/2009 | Dobeck et al. ............... 701/200 |
| 7,586,439 B2 * | 9/2009 | Percy et al. ............... 342/357.52 |
| 7,860,650 B2 * | 12/2010 | Se et al. ........................ 701/213 |
| 7,917,287 B2 * | 3/2011 | Suzuki et al. ................ 701/209 |
| 2001/0027111 A1 * | 10/2001 | Motegi et al. ................ 455/519 |
| 2002/0143466 A1 * | 10/2002 | Mutoh ......................... 701/207 |
| 2004/0048620 A1 * | 3/2004 | Nakahara et al. .......... 455/456.1 |
| 2006/0256005 A1 * | 11/2006 | Thandu et al. ............ 342/357.06 |
| 2007/0213043 A1 * | 9/2007 | Son ............................. 455/422.1 |
| 2009/0017803 A1 * | 1/2009 | Brillhart et al. ............ 455/414.2 |
| 2009/0043491 A1 * | 2/2009 | Haatainen ..................... 701/201 |
| 2009/0098888 A1 * | 4/2009 | Yoon .......................... 455/456.2 |
| 2009/0164120 A1 * | 6/2009 | Boore et al. ................. 701/210 |

FOREIGN PATENT DOCUMENTS

| | | |
|---|---|---|
| CN | 1482434 | 3/2003 |
| CN | 1482434 | 3/2004 |
| CN | 1530633 | 9/2004 |
| JP | 08-285620 | 11/1996 |
| JP | 09-053949 | 2/1997 |
| JP | 11-201770 | 7/1999 |
| JP | 2001-108460 | 4/2001 |
| JP | 2001-165679 | 6/2001 |

(Continued)

*Primary Examiner* — Khoi Tran
*Assistant Examiner* — Jaime Figueroa
(74) *Attorney, Agent, or Firm* — Cozen O'Connor

(57) ABSTRACT

A mobile phone terminal has a positional information acquisition unit acquiring present positional information indicating a present position, a destination information acquisition unit acquiring destination information specifying a destination (where to return, and where to go), a navigation unit navigating a route from a position specified by the present positional information acquired by the positional information acquisition unit to a destination specified by the destination information, upon activation, a distance acquisition unit acquiring a distance between a position specified by the present positional information acquired by the positional information acquisition unit and a destination specified by the destination information, and an activation control unit activating the navigation unit depending on a distance acquired by the distance acquisition unit.

12 Claims, 16 Drawing Sheets

(56) References Cited

FOREIGN PATENT DOCUMENTS

| | | |
|---|---|---|
| JP | 2002-081957 | 3/2002 |
| JP | 2002-168640 | 6/2002 |
| JP | 2002-340608 | 11/2002 |
| JP | 2003-042786 | 2/2003 |
| JP | 2003-227727 | 8/2003 |
| JP | 2004-077227 | 3/2004 |
| JP | 2004-101366 | 4/2004 |
| JP | 2004-294429 | 10/2004 |
| JP | 2006-329841 | 12/2006 |

* cited by examiner

| SUBSCRIBER PHONE NO. | MAIL ADDRESS | POSITION DATA | ........ |

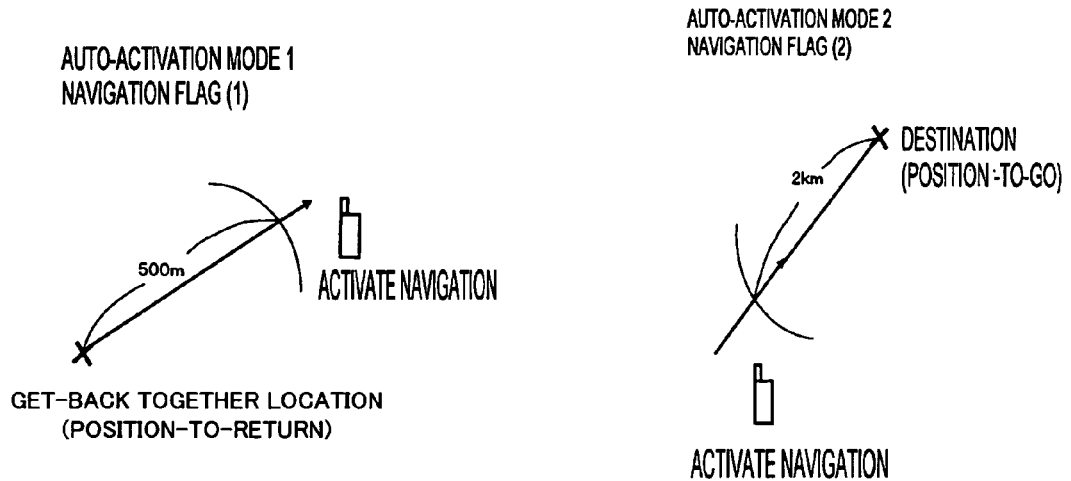
FIG. 4A
FIG. 4C
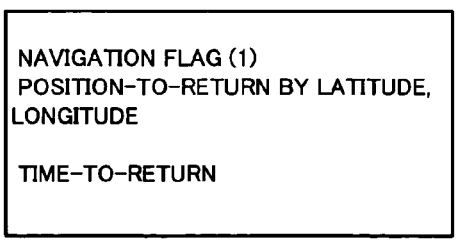
FIG. 4B
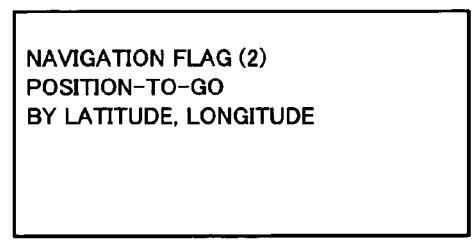
FIG. 4D

FIG. 6A

ACTIVATE NAVIGATION

AUTO-ACTIVATION OF NAVIGATION -
REGISTER POSITION-TO-RETURN

AUTO-ACTIVATION OF NAVIGATION -
REGISTER POSITION-TO-GO   [CONFIRMED]   [RESET]

FIG. 6B

DESTINATION    LATITUDE    _____   [CONFIRMED]
                    LONGITUDE    _____

DESIGNATE ON MAP    [NEXT]

DESIGNATE BY ADDRESS    [NEXT]

FIG. 6C

TIME SETTING ____ HOUR ____ MIN.
   (BY TIME OF RETURNING)

OR AFTER ____ HOUR ____ MIN.
   (BY AMOUNT OF TIME)
                    ARRIVE AT DESTINATION

[CONFIRMED]   [RESET]

FIG. 6D

ACTIVATE NAVIGATION

DO YOU WISH NAVIGATION ?

[YES]   [NO]

FIG. 6E

SPECIFY REFERENCE DISTANCE AND TIME FOR ACTIVATING NAVIGATION

REFERENCE DISTANCE _____ M

TIME SETTING ____ HOUR ____ MIN.

[CONFIRMED]   [RESET]

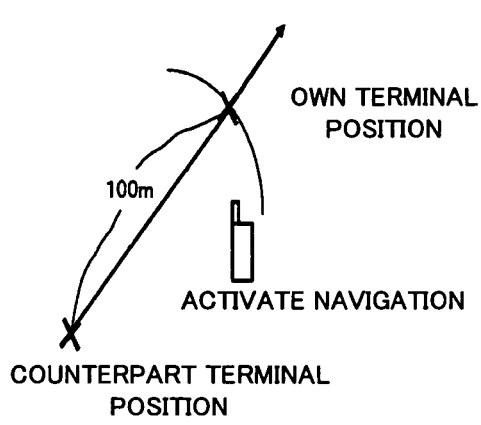
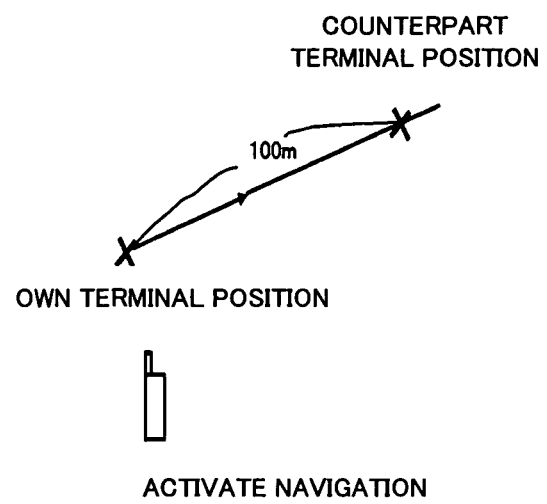
FIG. 8A
FIG. 8B

ADDRESS BOOK

| COUNTERPART NAME | PHONE NO. | COMPANY FLAG |
|---|---|---|
| MOTHER | NNN-NNNN-NNNN | − |
| FATHER | NNN-NNNN-NNNN | ○ |
| ″ | ″ | ″ |
| ″ | ″ | ″ |
| ″ | ″ | ″ |
|  |  |  |

TERMINAL DEVICE AND RECORDING MEDIUM

BACKGROUND OF THE INVENTION

1. Field of the Invention

The present invention relates to a portable terminal device having a position acquisition function and a navigation (guiding) function, a system including the portable terminal device, and a recording medium storing a program which allows a computer to function as the foregoing portable terminal device.

2. Description of the Related Art

A mobile phone device which has a GPS (Global Positioning System) function and a navigation function, and navigates a route to a destination based on a present position, is known. Unexamined Japanese Patent Application KOKAI Publication No. 2004-294429, for example, discloses such a mobile phone device which has a navigation function for navigating a route to a destination where a user should return, such as a home.

In general, navigation function is highly burdened, and consumes a large electrical power. On the other hand, mobile phones are generally operated by a battery in view of portability. Therefore, if the navigation function is continuously activated, a problem such as battery run-out may occur easily. Thus, the mobile phone disclosed in Unexamined Japanese Patent Application KOKAI Publication No. 2004-294429 activates the navigation function only when a user instructs to operate.

For example, in the case of a group bus tour, the location where people got off is often appointed as the position-to-return where the people get back after off-the-bus free sightseeing. In this case, it is difficult for people to determine timing to start returning to the position-to-return, and a navigation function is useful for guiding the route to the position-to-return. However, if the navigation function is activated before it is necessary, the battery may run out while returning.

Not only in the case of a bus tour but also a case of meeting a person, similarly to the case of off-the-bus sightseeing, the navigation function may be activated often before it is necessary, the battery may also run out on the way.

Also, an operation for setting the navigation function is troublesome and confusing, and there is a problem that children and old people cannot be friendly with operation and fully utilize the navigation function. Even if the child carries a mobile phone with the navigation function, there is a case that the child cannot use the mobile phone with the navigation function when he gets lost from his parents.

SUMMARY OF THE INVENTION

The present invention is made in view of the foregoing problems. It is an object of the invention to enable automated activation of a navigation function at a suitable timing.

To achieve the object, a terminal device of the invention comprises: a positional information acquisition unit which acquires positional information indicating a position; a destination information acquisition unit which acquires destination information specifying a destination; a navigation unit which navigates a route from a position specified by the positional information acquired by the positional information acquisition unit to a destination specified by the destination information upon activation; a distance acquisition unit which acquires a distance between a position specified by the positional information acquired by the positional information acquisition unit and the destination specified by the destination information; and an activation control unit which activates the navigation unit depending on the distance acquired by the distance acquisition unit.

According to the invention, a navigation unit is automatically activated at a suitable timing based on the positional relationship between a destination and a present position.

BRIEF DESCRIPTION OF THE DRAWINGS

These objects and other objects and advantages of the present invention will become more apparent upon reading of the following detailed description and the accompanying drawings in which:

FIGS. 4A through 4D are diagrams showing structural examples of user information stored in the management server;

FIGS. 6A through 6E are examples of instruction-set for each input screens;

FIG. 8A is a conceptual view for describing an operation in a second embodiment for a "missing mode" to activate a navigation function which navigates a route from a counterpart terminal to an own terminal if a distance between the counter terminal position and the own terminal position reaches at more than or equal to a specified distance;

FIG. 8B is a conceptual view for describing as an operation in the second embodiment for a "meeting mode" to automatically activate the navigation function which navigates a route from a counter terminal to an own terminal if a distance between the counterpart terminal position and the own terminal position reaches at less than or equal to a specified distance;

FIG. 9 is a memory table for describing an address book;

FIGS. 10A and 10B are flowcharts showing further the second embodiment for an operation performed by a CPU resulting from the power of a mobile phone is turned on;

DETAILED DESCRIPTION OF THE PREFERRED EMBODIMENTS

Hereinafter, the preferred embodiments of the present invention will be described in detail with reference to the drawings.

A. First Embodiment

A mobile phone device (cell-phone) according to the first embodiment of the present invention is described with reference to FIG. 1 through FIG. 6D.

Figure 1:
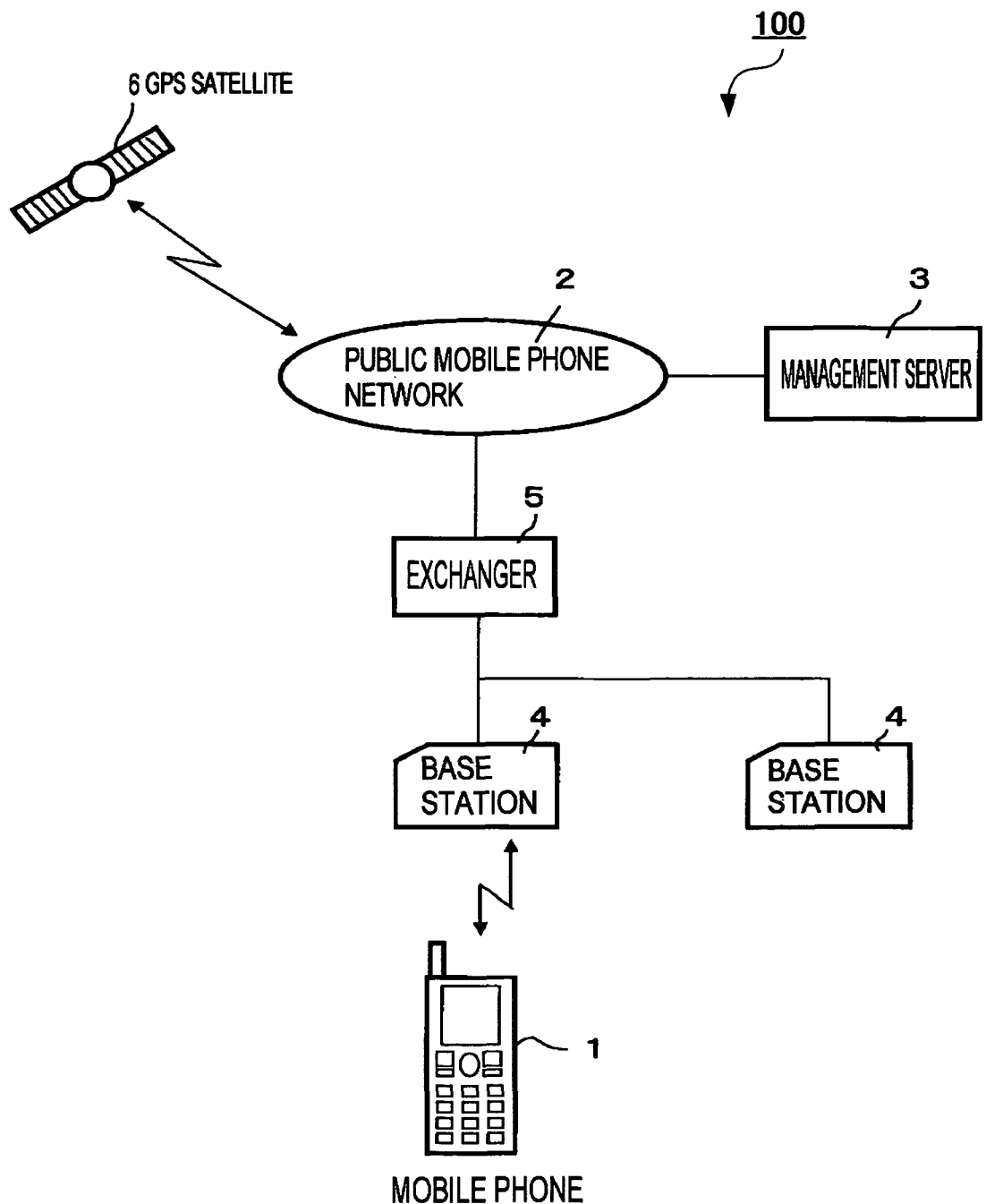
FIG. 1 is a block diagram showing a communication network system including a portable terminal device according to an embodiment of the invention.

A mobile phone device 1 of the embodiment is used in a communication system 100 shown in FIG. 1. The communication system 100 includes the mobile phone device 1, a management server 3, a public mobile phone network 2 having a plurality of base stations 4 and an exchanger device (exchange equipment) 5, and a plurality of GPS satellites 6.

The mobile phone device 1 has a mobile phone function, a GPS function of receiving GPS signals from the plurality of GPS satellites 6 to identify a present position, and a navigation function.

The mobile phone function of the mobile phone device 1 is the same as the basic function of a general mobile phone. For example, the mobile phone 1 communicates the management server 3 via the public mobile phone network 2, and registers an own position (a cell where the mobile phone device 1 is present) in the management server 3. This enables the mobile phone device 1 to communicate with another telephone terminal.

The GPS function of the mobile phone device 1 receives GPS signals from GPS satellites 6, and acquires a present position (e.g., latitude and longitude) from the received GPS signals.

The navigation function of the mobile phone device 1 requests a navigation map to the management server 3, and navigates a route to a destination using the map received from the management server 3. The navigation function has a plurality of operation modes, and is automatically activated at timing according to a selected operation mode.

The public mobile phone network 2 has the plurality of base stations 4 and the exchanger device 5, and enables the mobile phone device 1 to establish a communication with another communication terminal.

A base station 4 connects the mobile phone device 1 in a responsible communication area (or cell) with the public mobile phone network 2. The exchanger device 5 switches a line to connect the mobile phone device 1 with a receiver terminal.

The management server 3 manages each mobile phone device 1, and stores management information user by user, such as a telephone number, a mail address, and a present position (a cell where a mobile phone now belongs). The management server 3 functions as a contents server which supplies a navigation content to the mobile phone device 1.

Figure 2:
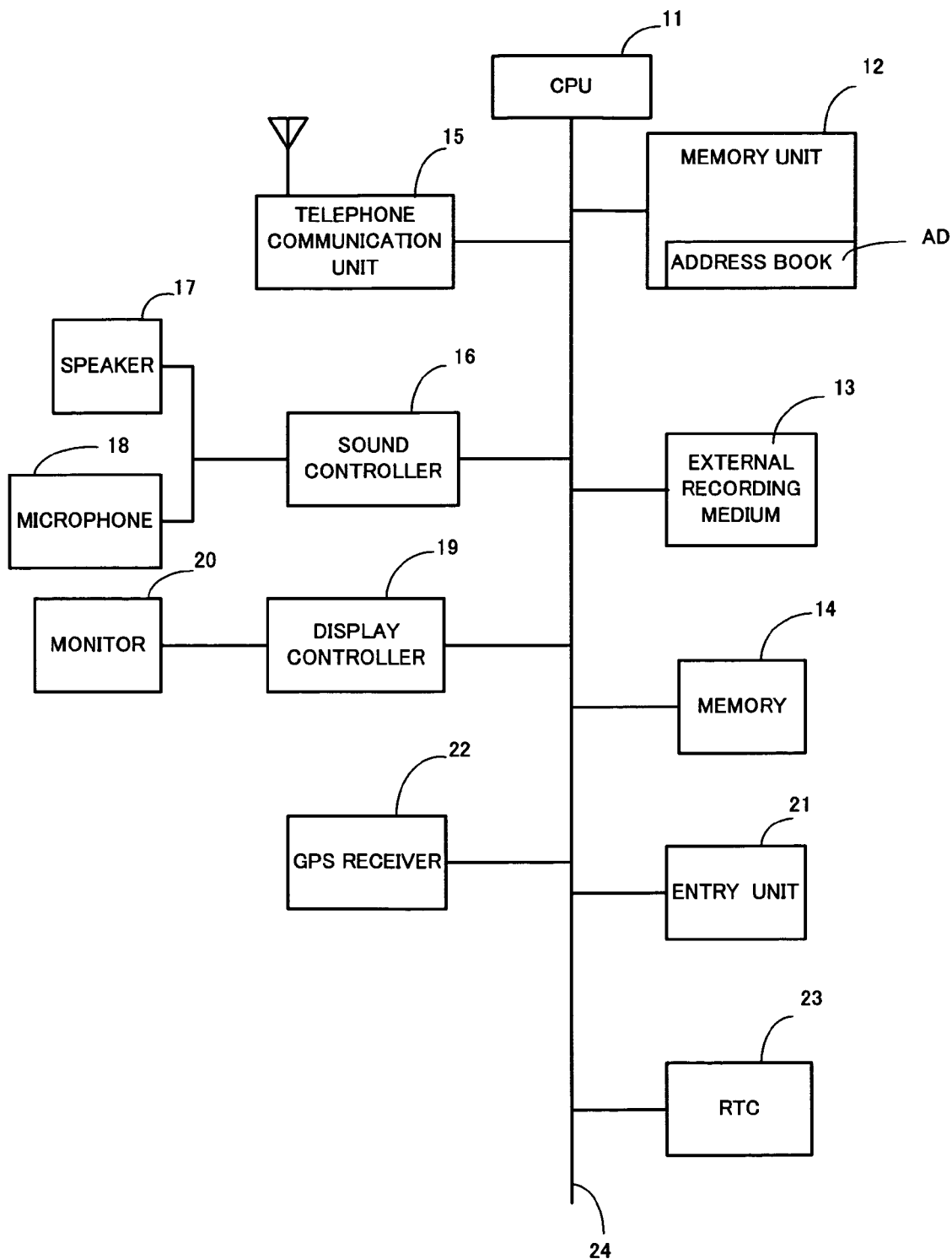
FIG. 2 is a block diagram showing the structure of a mobile phone device.

As shown in FIG. 2, the mobile phone device 1 comprises a CPU 11, a memory unit 12, a recording medium 13, a memory 14, a telephone communication unit 15, a sound controller 16, a speaker 17 for receiver, a microphone 18 for transmitter, a display controller 19, a monitor 20, an entry unit 21, a GPS receiver 22, an RTC 23, and a bus 24.

The CPU (Central Processing Unit) 11 controls entire operations of the mobile phone device 1 in accordance with various programs stored in the memory unit 12.

The memory unit 12 is an internal memory, and has a program area and a data area. The program area of the memory unit 12 stores programs for realizing an operation to be discussed later with reference to FIG. 6A through FIG. 6D. The data area of the memory unit 12 stores information for the mobile phone function like an address book AD, a fixed information for realizing the navigation function.

The external recording medium 13 is a portable memory removably attached thereto by an interface. The external recording medium 13 comprises, for example, an SD card, an IC card, or the like. The external recording medium 13 stores a recorded content, or the like.

The memory 14 comprises a RAM (Random Access Memory) or the like, and functions as a work area for the CPU 11. Various data in the memory 14 can be saved in the memory unit 12 when necessary.

The telephone communication unit 15 has an antenna, a receiver, and a transmitter. The receiver receives a radio signal of a specified frequency via the antenna. The transmitter demodulates a baseband signal from the received signal, reproduces an original speech signal and data from the baseband signal, and supplies the speech signal to the sound controller 16 and the data to the CPU 11. The sound controller 16 outputs the supplied speech signal from the speaker 17. The CPU 11 processes supplied data, e.g., a content (e.g., map information) supplied from the management server 3, and displays it on the monitor 20 via the display controller 19.

The transmitter of the telephone communication unit 15 captures speech data input by the microphone 18 via the sound controller 16, encodes it onto a baseband signal, modulates a carrier signal with the baseband signal, and transmits the modulated signal via the antenna. The transmitter of the telephone communication unit 15 encodes data supplied from the CPU 11 onto a baseband signal, modulates a carrier signal with the baseband signal, and transmits the modulated signal via the antenna.

The entry (input) unit 21 has operable keys, such as number/character input keys, dial keys, etc., and enters (inputs) a dial number, characters, commands, etc. therefrom. The CPU 11 performs a process depending on an input signal from the entry unit 21.

The GPS receiver 22 receives GPS signals from the plurality of GPS satellites 6, and acquires a present position (latitude and longitude information). The CPU 11 accesses the GPS receiver 22 to acquire a present position.

The RTC (Real Time Clock module) 23 constitutes a clock unit. The CPU 11 acquires a present time from the RTC 23. The RTC 23 can measure an arbitrary time, and functions as a 10-minutes timer to be discussed later.

The bus 24 transmits data.

Figures 3A, 3B:
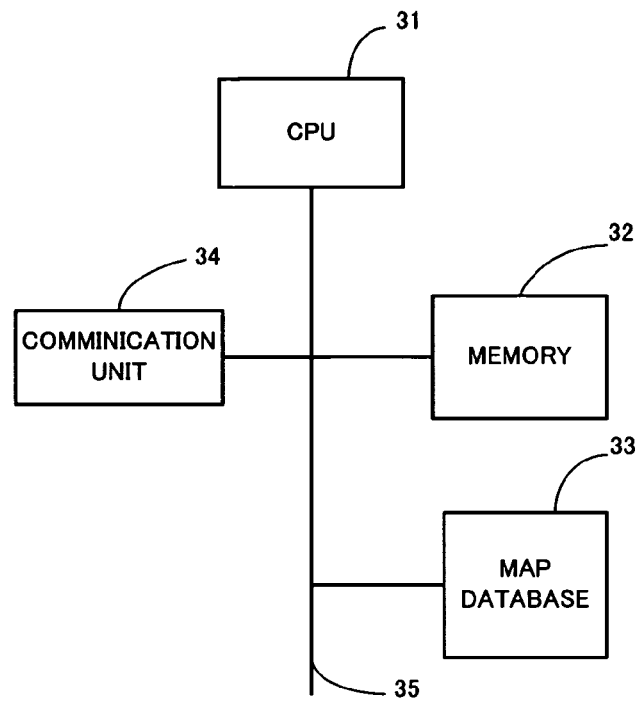
FIG. 3A is a block diagram showing an example of structure of a management server.
FIG. 3B is a data frame showing an example of management information stored in the management server.

As shown in FIG. 3A, the management server 3 comprises a CPU 31, a memory 32, a map database 33, a communication unit 34, and a bus 35.

The CPU (Central Processing Unit) 11 manages each mobile phone device 1 in accordance with various programs stored in the memory 32.

The memory 32 has a program area and a data area. The program area stores a management program for managing the mobile phone device 1, and a program for reading out a map from the map DB 33 and supplying the read-out map in response to a request from the mobile phone device 1. The data area stores, for example, a table which associates the telephone number of each mobile phone device 1 with a present position (or a cell). As shown in FIG. 3B, the memory 32 stores management information which associates the telephone number of each mobile phone device 1, a mail address, positional information (information on cell where a mobile phone device 1 is present), etc. correspondingly with one another. The CPU 31 updates the positional information of each mobile phone device 1 as required.

The map DB (DataBase) 33 stores a large amount of map information to be supplied to the mobile phone device 1.

The communication unit 34 communicates with the mobile phone device 1 via a communication network like the Internet, a gateway, the public mobile phone communication network 2, etc.

The bus 35 transmits data.

Next, the navigation function of the mobile phone device 1 is described.

The navigation function of the mobile phone device 1 has two activation modes: a manual activation mode; and an automated activation mode.

The manual activation mode is a mode for activating the navigation function by a manual operation of a user. In contrast, the automated activation mode is a mode for automatically activating the navigation function when condition for starting navigation set previously is satisfied.

Further, the automated activation mode has two modes: a first automated activation mode (1); and a second automated activation mode (2).

In the first automated activation mode (1), when the position-to-return is previously set, the mobile phone device 1 activates the navigation function when the mobile phone device 1 moves apart from the position-to-return more than a specified distance.

Specifically, assuming that people get off a bus is set as a position-to-return where the people should get back after a free time off-the-bus sightseeing. As shown in FIG. 4A, when detecting that the mobile phone 1 moves apart from the position-to-return by a specified distance (for example 500m), the mobile phone device 1 automatically activates the navigation function (auto-activation mode (1)) to navigate a route from a present position to the position-to-return. The "position-to-return" is registered previously by the user's operation. The CPU 11 receives a distance between the present position and the position-to-return every time whenever the GPS receiver 22 receives a new present position, and compares the distance with a reference value (e.g., 500 m), and automatically activates the navigation function if a condition "distance≥reference value" is satisfied.

In the first automated activation mode (1), as shown in FIG. 4B, a first navigation flag (1) indicating the first automated activation mode, the position-to-return, a time-to-return, etc. are registered in the memory 14.

In the second automated activation mode (2), when a destination or "position-to-go" is previously set, the mobile phone device 1 activates the navigation function when the mobile phone device 1 moves into within a range of specified distance from the destination or "position-to-go".

Assuming a specific case of when a user takes a public transportation for going to a destination from his home. In this case, usually, navigation is not necessary from the home to a station to get on the public transportation. On the other hand, the user is unfamiliar with the vicinity of the destination, and navigation may be desirable. Thus, as shown in FIG. 4C, the mobile phone device 1 automatically activates the navigation function (auto-activation mode (2)) whenever the mobile phone device 1 is detected that it reaches at the destination less than a specified distance (for example, 2 km) in the second automated activation mode (2) and navigates a route to a "position-to-go". In this case, the "position-to-go" is registered beforehand by a user's operation. The CPU 11 acquires a distance between a present position and the position-to-go whenever a new present position is received by the GPS receiver 22, and compares the distance with a reference value, and automatically activates the navigation function if a condition "distance≤reference value" is satisfied.

In the second automated activation mode (2), as shown in FIG. 4D, a second navigation flag (2) indicating that the second automated activation mode (2) is set and "a position-to-go" are registered in the memory 14.

Next, an operation of the mobile phone device 1 is described.

As the main power of the mobile phone device 1 is turned on, the CPU 11 starts a process shown by the flowcharts in FIG. 5A through FIG. 5D.

First, the CPU 11 activates the telephone communication unit 15 and registers a present position in management information (FIG. 3B) stored in the management server 3, and is in a standby state (step A1). In the standby state, the CPU 11, the memory unit 12, the RTC 23, the telephone communication unit 15, the GPS receiver 22 are activated, and the mobile phone device 1 is in a transmittable/receivable state.

Subsequently, the CPU 11 checks presence/absence of reception of a call or a mail (step A2). If receipt of a telephone or a mail is detected (step A2: Yes), the CPU 11 performs a reception process for generating and outputting a receiving notice such as an arriving melody (step A3).

Figure 5A:
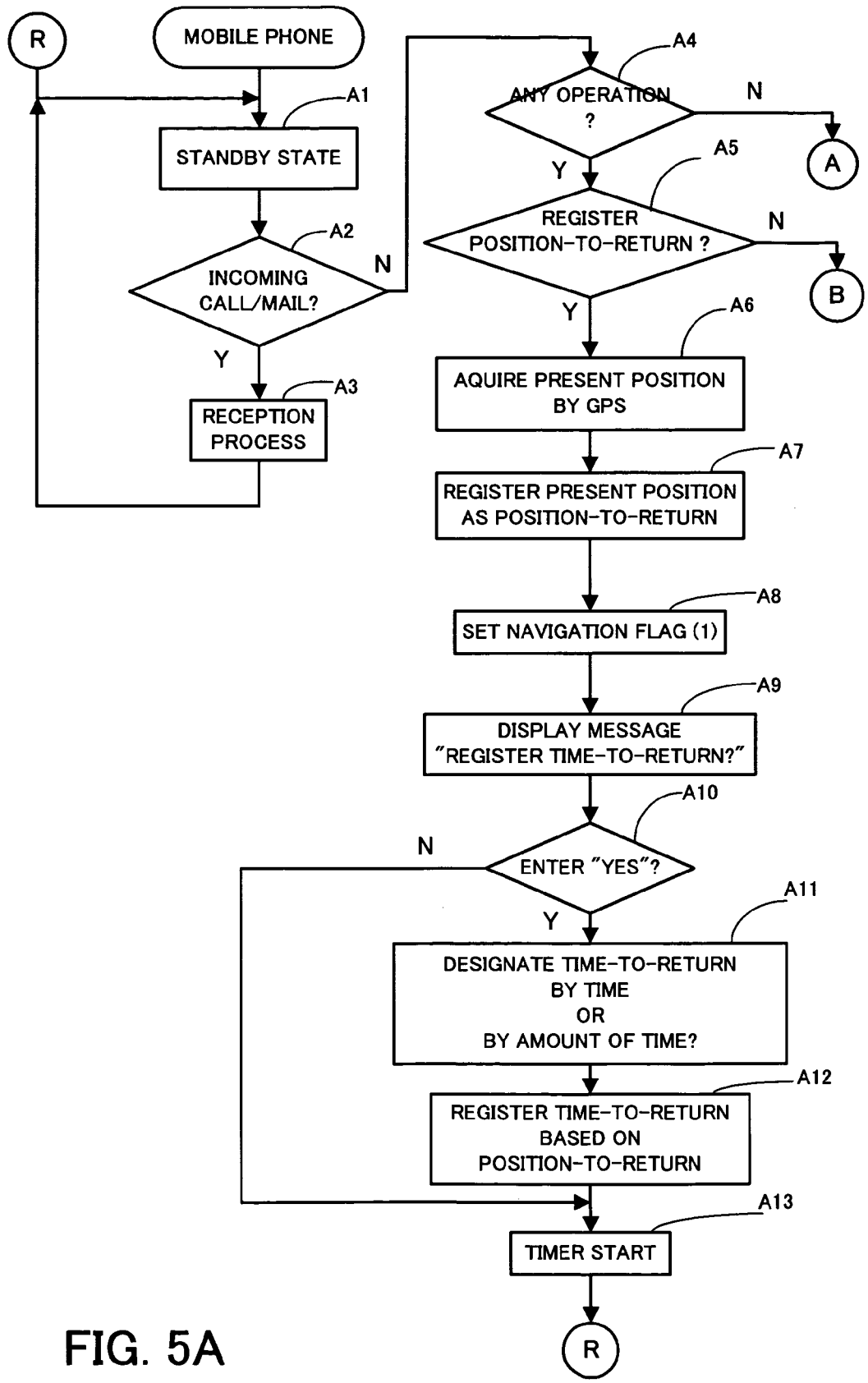
FIGS. 5A and 5B are flowcharts for describing a first automated activation mode (1) for automatically activating a navigation function which navigates a route from a present position to a position-to-return when a mobile phone is remote from a position-to-return more than or equal to a specified distance.
Figure 5B:
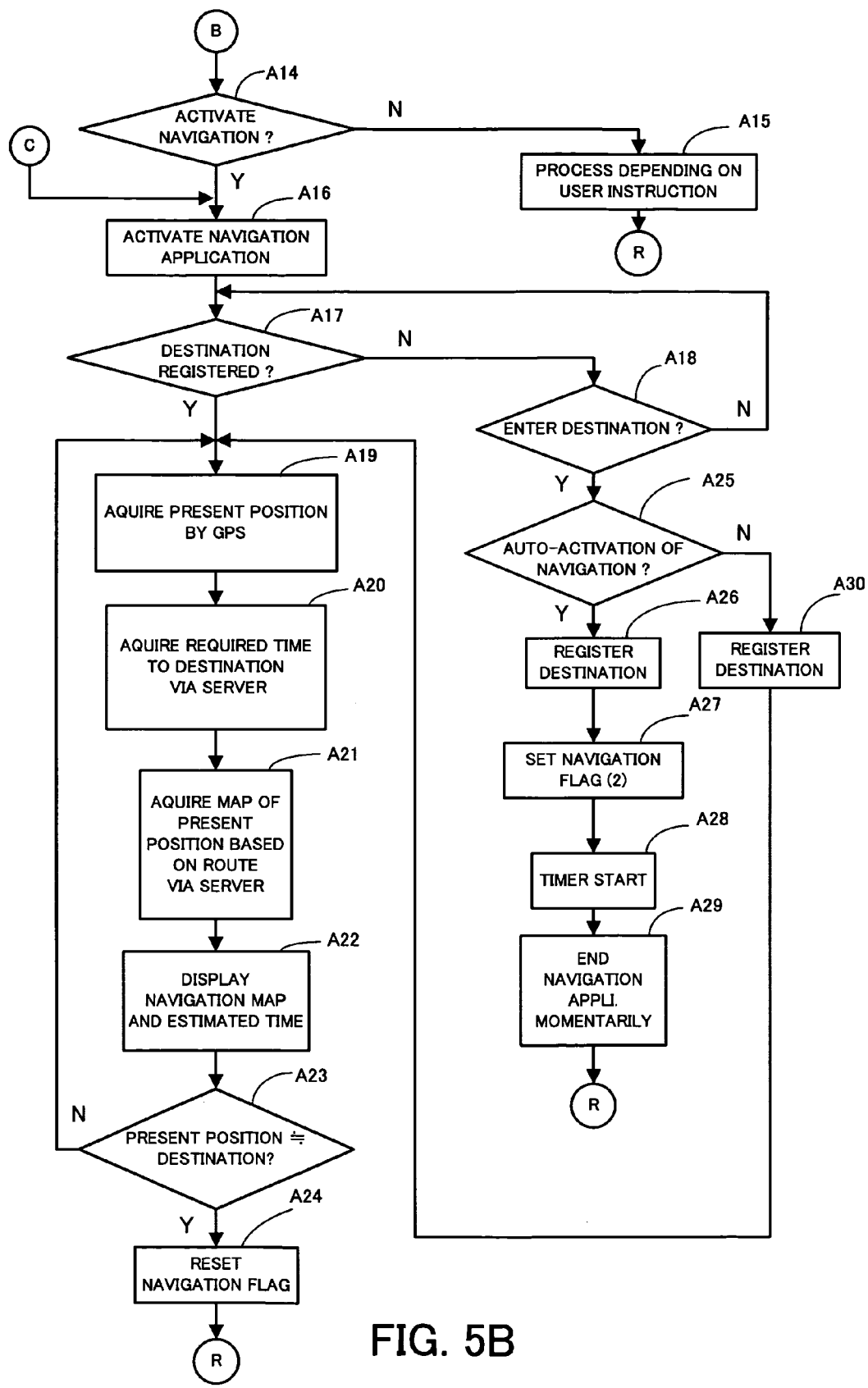

If receipt of a telephone or a mail is not detected (step A2: No), operation of the entry unit 21 is detected (step A4). By detecting that the entry unit 21 is operated (step A4: Yes), the CPU 11 determines whether the operation is for registering a "position-to-return (present position)" or not (step A5). If the operation is not the operation for registering the position-to-return (step A5: No), it determines whether the operation is for instructing activation of the navigation function (FIG. 5B: step A14). If a result of step A14 is "No", i.e. other operation is performed, processes corresponding to the operations, such as a telephone call process or a mail creation process etc. is performed (step A15), and then the flow returns to step A1.

Next, an operation of the mobile phone device 1 in the manual activation mode is described.

In this case, a user requests the monitor 20 to display an operation screen, for example, shown in FIG. 6A, and instructs "activation of the navigation function".

The CPU 11 detects this operation and determines "Yes" at step A14, and starts the navigation program stored in the program area of the memory unit 12 (step A16). Subsequently, the CPU 11 determines whether or not a destination is set (step A17). In an initial state, a destination is not registered. Therefore, the CPU 11 determines "No" at step A17, displays a destination-input screen on the monitor 20 as exemplified in FIG. 6B and waits for the entry of a destination by the user (steps A17, A18: No). The user enters a destination with the destination-input screen as exemplified in FIG. 6B. The method for designating a destination is optional. For example, a user may directly enter the latitude and longitude of the destination. Alternatively, the user may designate the position by having the monitor 20 display a map and pointing an optional point on the displayed map. Further, the user may enter an address or a zip code so that the CPU 11 may convert the input information to positional information based on a cross-reference table preset beforehand.

When a destination is entered, the CPU 11 detects this and determines "Yes" at step A18, and determines whether the entry is related to automated activation (step A25). Because this example is a case for manual activation of navigation function, the CPU 11 determines "No" at step A25, and registers the destination entered by the user's operation in the work area of the memory 14 (step A30).

Subsequently, the CPU 11 performs a navigation process to navigate a route sequentially from a present position to the destination (steps A19 to A23).

Specifically, the CPU 11 receives information for specifying a present position from the GPS receiver 22 (step A19).

Subsequently, the CPU 11 receives a route from the present position to the destination and time necessary for travel from the management server 3 (steps A20, A21). More specifically, the CPU 11 transmits the present position, the entered destination and a request for requesting the route to the management server 3 via the telephone communication unit 15. The CPU 31 of the management server 3 receives these information via the communication unit 34. The CPU 31 acquires a route and a distance between the present position and the destination. The CPU 31 acquires a time to reach at the destination by dividing the acquired distance by a normal moving speed. The CPU 31 transmits the acquired information to the mobile phone device 1 via the communication unit 34. The CPU 11 of the mobile phone device 1 receives the route, the distance, and traveling time from the present position to the destination, from the management server 3 (step A20). The CPU 11 requests a map of area around the present position to the management server 3 based on the received route, display scale reduction, etc. The CPU 31 of the management server 3 receives the request, reads out a map corresponding to the request from the map DB 33, and transmits the map to the mobile phone device 1. The CPU 11 of the mobile phone device 1 receives the map from the management server 3 (step A21).

The CPU 11 generates a navigation image from the information including the map, route, distance, and time received from the management server 3, and displays the navigation image on the monitor 20 via the display controller 19 (step A22).

Next, the CPU 11 determines whether or not the present position approximately matches the destination, i.e., whether or not a user arrives the destination (step A23). By determining that the user has not yet arrived the destination (step A23: No), the CPU 11 returns the process to step A19, and repeats the foregoing steps until the user arrives at the destination. In this manner, the navigation image displayed on the monitor 20 changes as a present position changes.

When the user arrives at the destination the CPU 11 determines "Yes" at step 23, and if the first or second navigation flag is set, resets the flag (step A24). Here, the case of manual activation is explained, the first or second navigation is not set. Therefore, the CPU 11 skips step A24, and makes the flow return to the standby state at step A1 in FIG. 5A.

Next, the first automated activation mode (1) which automatically activates the navigation function of an operation of the mobile phone device 1 is described.

The first automated activation mode (1) is used, for example, in a case when a position where a person gets off a bus (present position) is registered as a position-to-return after a free time of off-the-bus tour, as described with reference to FIG. 4A. In this case, a user operates the entry unit 21, and calls up a navigation activation screen, for example, shown in FIG. 6A, and selects "auto (automated)-activation of navigation and registration of position-to-return".

In response to this selection, the CPU 11 obtains a present position from the GPS receiver 22 (step A6), and registers the present position as a destination (position-to-return) in the memory 14 (step A7). The CPU 11 may request a map including the present position to the management server 3, display the map received from the management server 3 on the monitor 20, and shows the present position by marking on the map.

Further, the CPU 11 sets the first navigation flag (1) in the work area of the memory 14 (step A8). The first navigation flag designates that the mobile phone device 1 is in the first automated activation mode (1) which automatically activates the navigation function that navigates a route from the present position to the "position-to-return (destination)".

Next, the CPU 11 displays a setting screen exemplified in FIG. 6C on the monitor 20 via the display controller 19 (step A9). This setting screen is for designating a target arriving time for returning to the original position (time-to-return). The "time-to-return" indicates by what time the user should return to the original position (present position). When the user designates time on the screen shown in FIG. 6C and enters "confirmed" button, the CPU 11 detects this operation and determines "Yes" at step A10, acquires the designated time (step A11), and registers the "time-to-return" in the work area of the memory 14 in association with the "position-to-return" (step A12), and makes the timer to start counting (step A13).

If the user does not enter time-to-return (step A10: No), the flow skips steps A11 and A12, and the CPU 11 makes the timer to start counting (step A13).

The user may directly input the "time-to-return" by hour, minute and second time scale, or, input can be made on an amount of time (time period) like "return after 60 minutes". When amount of "time" is designated, the CPU 11 adds the designated amount of time to a present time being counted by the RTC 23 to obtain the "time-to-return", and stores the acquired time in the memory 14.

Subsequently, the CPU 11 starts a timer (step A13) (hereinafter called 10-minutes timer) for obtaining a present position from the GPS receiver 22 at regular intervals (e.g., every ten minutes), and the CPU 11 makes the flow return to the standby state at step A1.

Figure 5C:
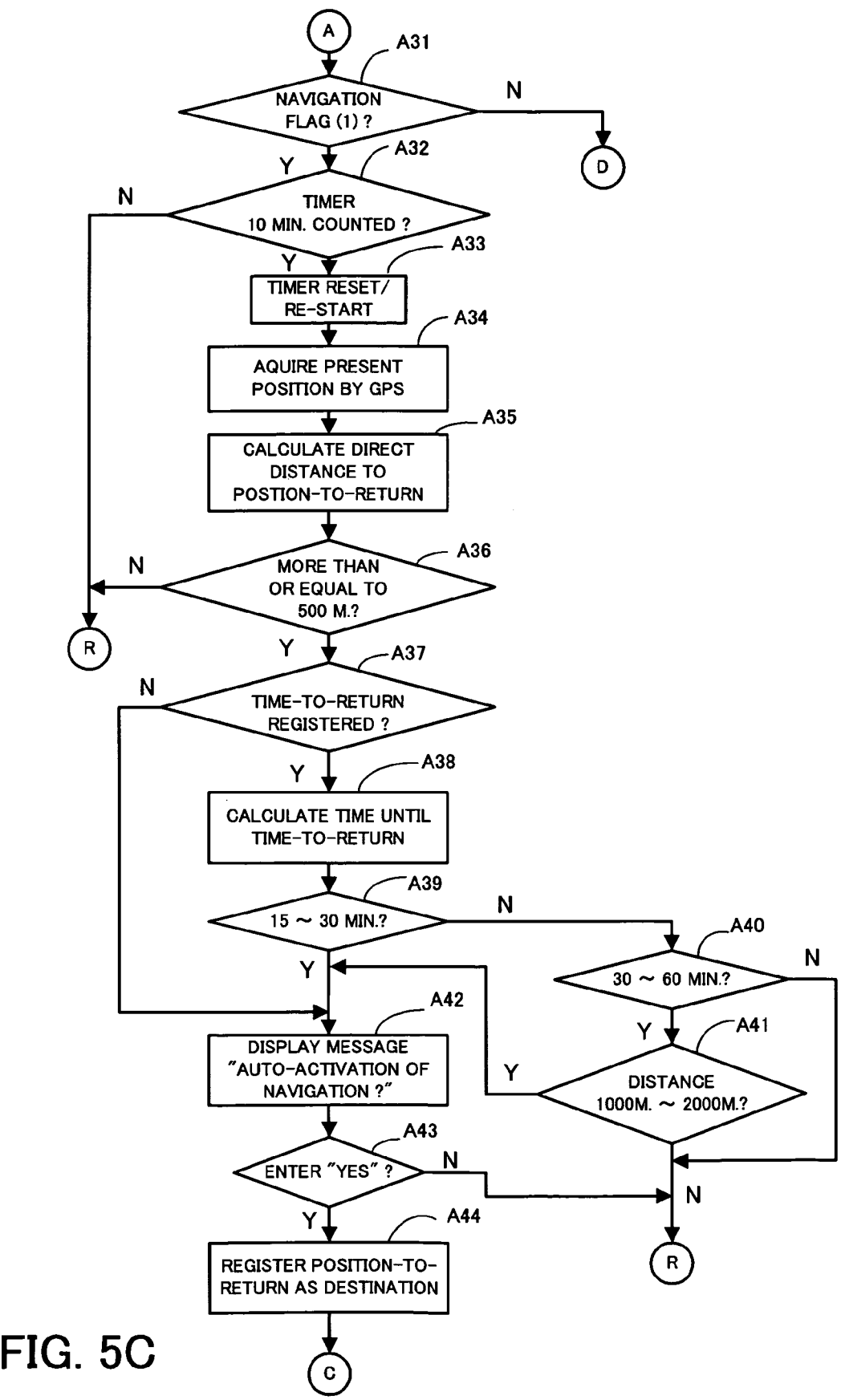
FIGS. 5C and 5D are flow charts for describing a second automated activation mode for automatically activating the navigation function which navigates a route from a present position to a "position-to-go" when a distance from a destination (position-to-go) reaches at less than or equal to a specified distance.
Figure 5D:
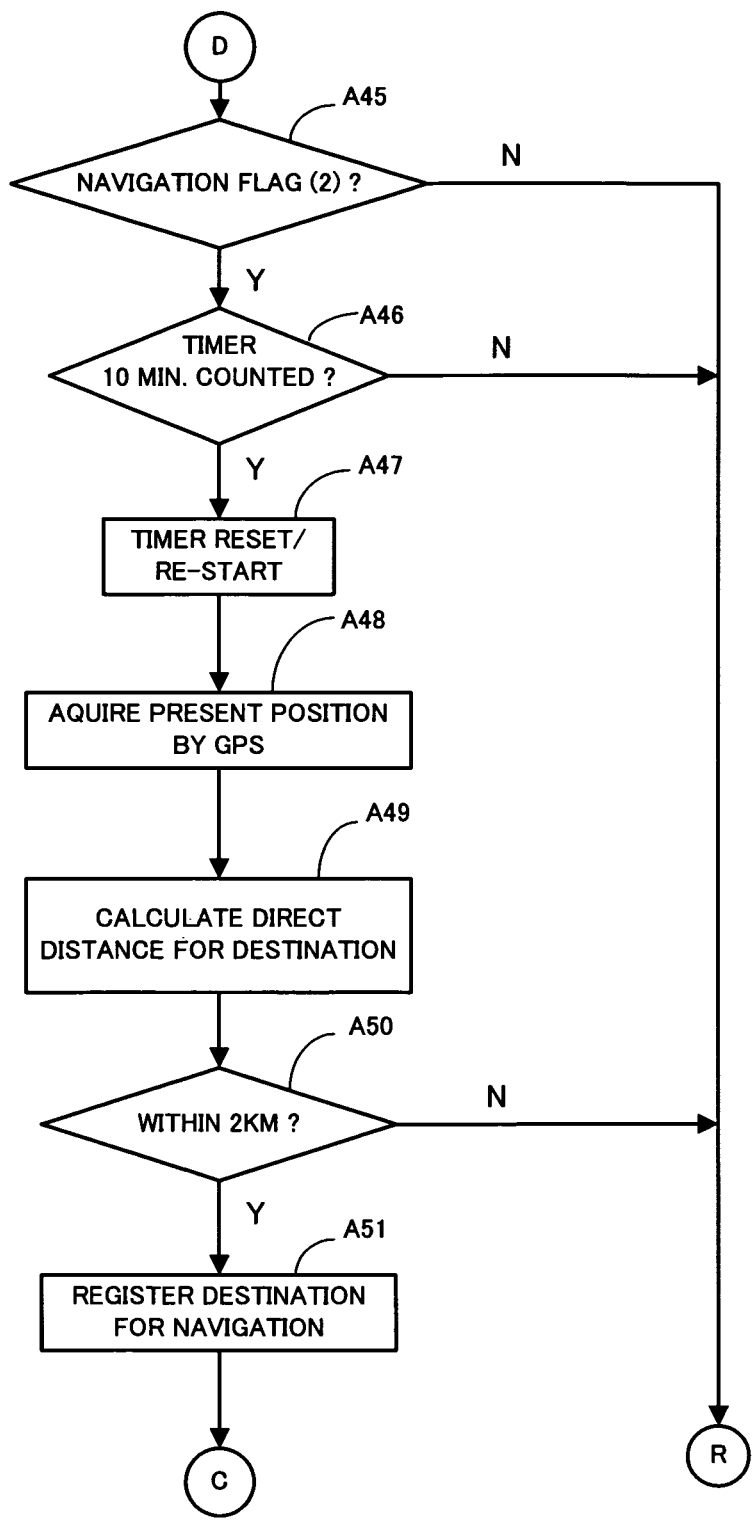

If it is determined "No" in step A4, i.e., the entry unit 21 is not operated, the flow progresses to step A31 in FIG. 5C. The CPU 11 determines whether or not the first navigation flag (1) is set (step A31). If it is determined that the "position-to-return" and the "navigation flag (1)" are set at step A8, the CPU 11 determines "Yes" at step A31 and the CPU 11 starts a process of checking whether or not a condition for automatically activates the navigation function is satisfied.

During checking process, first, the CPU 11 determines whether or not time more than or equal to ten minutes passed after the 10-minutes timer starts counting, until the time is elapsed at step A32. If it is before time is elapsed (step A32: No) and the CPU determines "No", and the flow returns to the standby state at step A1. On the other hand, if "Yes" is determined at step A31, or time is elapsed after the timer has counted 10 minutes (step A32: Yes), the CPU 11 resets the 10-minutes timer, restart (step A33), and receives information specifying a present position from the GPS receiver 22 (step A34). Next, the CPU 11 calculates a distance (direct distance) between the present position indicated by the information obtained from the GPS receiver 22 and the "position-to-return" registered in the memory 14 (step A35).

Figure 7:
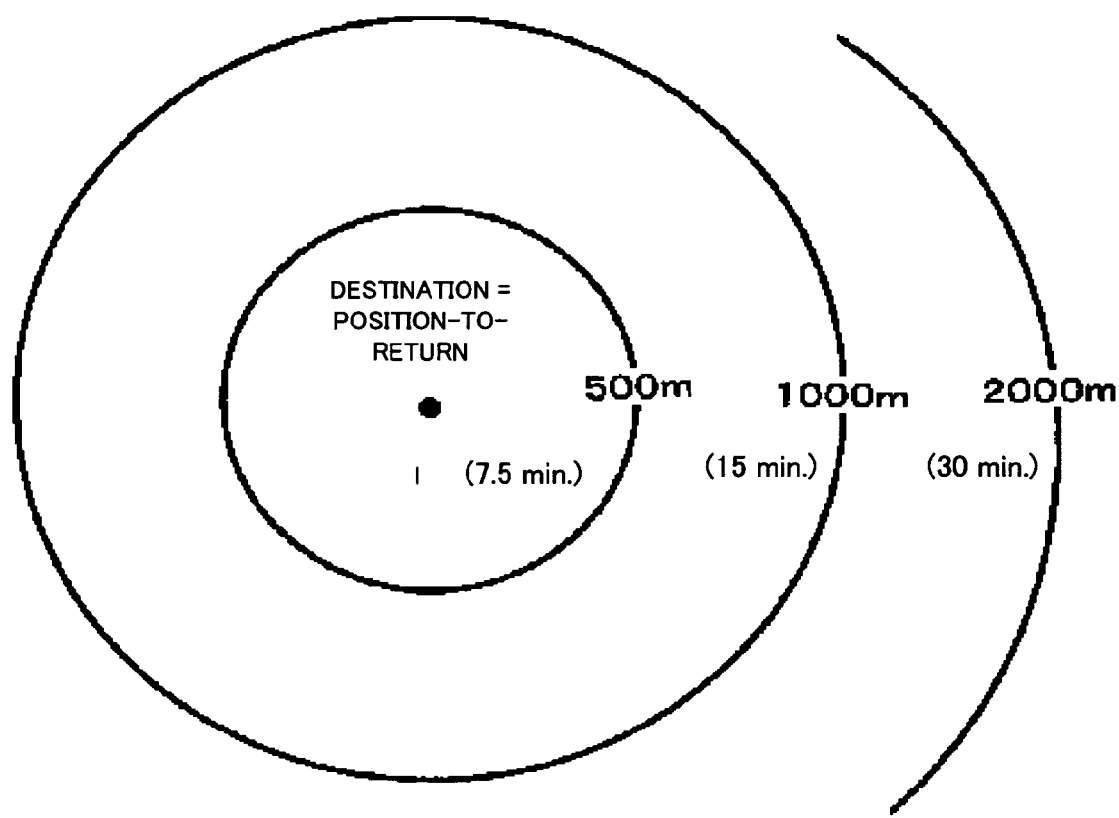
FIG. 7 is a diagram showing a relationship between a distance (direct distance) from a present position to a "position-to-return" and times necessary for moving by distances.

Assuming that a walking speed is 4 km per hour, and when the user returns to the "starting point (position-to-return)" from respective three positions "500 m", "1000 m", and "2000 m" apart from the "starting point", then required times are "7.5 minutes", "15 minutes", and "30 minutes", respectively. Therefore, as shown in FIG. 7, if the present position is within a range of 500 m, or if a range falls between 500 m and 1000 m, or if a range falls between 1000 m and 2000 m, the user should start returning before 7.5 minutes, 15 minutes, or 30 minutes respectively. The foregoing distance and time may be any values arbitrary set beforehand by the user's operation using the input screen as shown in FIG. 6C.

Next, the CPU 11 determines whether or not a distance (direct distance) between the position-to-return and the present position is larger than a specified value for activating the navigation function (for example, more than 500 m) (step A36). If it is determined that the distance is less than the specified value (step A36: No), the CPU 11 determines that it is not necessary to activate the navigation function at this point, the CPU 11 makes the flow return to the standby state at step A1. If the distance (direct distance) between the position-to-return and the present position is more than the reference value (step A36: Yes), the CPU 11 then determines whether or not a "time-to-return" is registered in association with the "position-to-return" (step A37). If it is determined that the "time-to-return" is not registered (step A37: No), the CPU 11 requests the user indicate whether or not automatically activate the navigation function. For example, a confirmation message as exemplified in FIG. 6D is displayed on the monitor 20 via the display controller 19 (step A42).

If the user enters "Yes", the CPU 11 detect this operation (step A43: Yes), and registers the "position-to-return" as the destination in the memory 14 (step A44), then the control returns to step A16. If the user does not enter "Yes" (step A43: No), the CPU makes the flow return to the standby state at step A1.

Subsequently, the flow progresses to step A16 in FIG. 5B, and the CPU 11 executes the navigation program stored in the memory unit 12, thereby activating the navigation function (navigation application).

Subsequently, the CPU 11 determines whether or not the "destination" is registered (step A17). In this example, the "position-to-return" is already registered as the "destination" at step A7 in FIG. 5A, so it determines "Yes" at step A17, and the process goes to the foregoing navigation process from step A19 to step A23 of sequentially navigating a route from the present position to the destination (position-to-return).

On the other hand, when determining at step A37 in FIG. 5C that the "time-to-return" is registered (step A37: Yes), the CPU 11 obtains a present time from the RTC 23, and calculates the difference between the present time and the "time-to-return" (step A38). Subsequently, the CPU 11 determines whether or not the time difference is within predetermined time, i.e., between 7.5 minutes and 15 minutes, or between 15 minutes and 30 minutes at steps A39 and A40.

If "Yes" at step A39, i.e., if a time difference is between 7.5 minutes and 15 minutes (corresponding to between 500 m and 1000 m), the CPU 11 displays via the display controller 19 a message as "Do you wish automatically activate navigation function?" as exemplified in FIG. 6D on the monitor 20. If the user wishes to activate the automated activation of the navigation function, he enters "Yes" via the key entry unit 21. The CPU 11 detects the operation (step A43: Yes), and registers the position-to-return as the destination (step A44). Subsequently, the flow moves to step A16, and the CPU 11 activates the navigation function. If "No" at step A39, the flow moves to step A40 to determine if a time difference is between 30 minutes and 60 minutes. If "No" at step A43, the flow returns to the standby state at step A1.

If "Yes" at step A40, i.e., a time difference falls between 30 minutes and 60 minutes, and "Yes" at step A41, i.e., the distance falls between 1000 m and 2000 m, the CPU 11 performs the process from steps A42 to A44 and A16 to automatically activate the navigation function on condition that the user acknowledges its activation. Thereafter, the navigation process of navigating a route from the present position to the destination (position-to-return) is performed as described above following steps A19 through A23 respectively. As the user moves following the navigation, and the present position approximately matches with the destination, the CPU 11 determines "Yes" at step A23, finishes the route navigation, and resets the first navigation flag set in the memory 14 (step A24). If "No" at steps A40 and A41, the CPU 11 makes the flow return to standby state at step A1.

Next, an operation of the mobile phone device 1 by the second automated activation mode (2) is described. The second automated activation mode (2) is used in such a case as described with reference to FIG. 4C, for example, when a user goes to a destination from his home using a public transportation. In this case, navigation from a home to the public transportation is normally known, but the user may wish navigation after he gets off the public transportation from a destined station for the destined location.

In such a case, the user requests the activation screen exemplified in FIG. 6A, selects "auto(automated)-activation of navigation" and registers position-to-return as destination, requests an input screen for entering the destination as exemplified in FIG. 6B, and completes the destination entry as required.

In this case, the CPU 11 determines that the automated activation mode (2) is instructed (step A25: Yes), and registers the designated destination (step A26), and sets the navigation flag (2) (step A27) in the work area of the memory 14. The second navigation flag (2) is specified as the second automated activation mode (2) for automatically activating the navigation function which sequentially navigates a route from a present position to the "destination", for example, as "position-to-go". Sequentially, the CPU 11 resets the 10-minutes timer to restart thereof (step A28), terminates the navigation function (step A29) momentarily, and the flow returns to the standby state (step A1).

If "No" at step A4, i.e., no operation is detected, the flow moves to step A31 in FIG. 5C. If navigation flag (1) has been reset at step A31 (step A31: No), the flow moves to step A45 in FIG. 5D, and the CPU 11 determines whether or not the navigation flag (2) is set.

In this example, the navigation flag (2) is set at step A27 in FIG. 5B and the CPU 11 determines "Yes" at step A45.

Subsequently, the CPU 11 determines whether or not ten minutes has passed after the 10-minutes timer starts counting (to determine if time is elapsed) (step A46). If time is still before its elapse (step A46: No), the CPU 11 makes the flow return to the standby state at step A1. If the counting of the 10-minute timer exceeds ten minutes (step A46: Yes), the CPU 11 resets the 10-minute timer for restarting thereof (step A47), receives a present position from the GPS receiver 22 (step A48), and calculates a distance (direct distance) between the destination (position to go) and the present position (step A49).

Subsequently, the CPU 11 determines whether or not the distance (direct distance) between the present position and the destination is less than a specified distance (for example, less than 2000 m) (step A50). If the distance is still exceeding the specified distance (step A50: No), it is not necessary to activate the navigation function, and the flow returns to the standby state at step A1.

If it is determined "Yes" at step A50, i.e., if the distance between the present position and the destination is less than the specified distance, the CPU 11 registers the "destination" in the memory 14 (step A51), activates the navigation function at step A16 in FIG. 5B, and determines whether or not the destination is registered at step A17. In this example, based on the fact that the "destination" is registered, the CPU 11 determines "Yes" at step A17, and performs the navigation process from step A19 to step A23 for sequentially navigating a route from the present position to the destination.

As the user moves following the navigation and present position approximately matches with the destination, the CPU 11 determines "Yes" at step A23, and resets the second navigation flag at step A24. If "No" at any one of steps A45, A46 and A50, the flow returns to the standby state at step A1.

In this manner, the mobile phone device 1 of the first embodiment obtains a distance between a present position received from the GPS receiver 22 and the registered destination, and automatically activates the navigation function depending on the obtained distance. Based on the positional relationship between the destination and a present position, navigation function is automatically activated at a suitable timing. Therefore, a person who is not friendly with operation can use the navigation function without activating the navigation function before it is necessary.

Also, the navigation function starts guiding navigation to the destination immediately when it is activated. In addition, by knowing a distance between a present position and a destination, an estimated time can be obtained based on a specified walking speed for guiding the estimated time together with a route thereof.

In the first automated activation mode (1), the CPU 11 activates the navigation function and starts navigating from a present position to a position-to-return if a distance between the present position and the destination (position-to-return) reaches at larger than a specified distance. As a result, a user acknowledges timing easily for returning. Also, a present position obtained from GPS receiver 22 can be registered as a position-to-return, so that the position-to-return (destination) can be accurately and easily registered.

A time difference between a present time and a time-to-return is obtained together with a distance between a present position and a position-to-return, and the navigation application is activated based on the distance and the time difference. This enables activation of the navigation function at more suitable timing.

In the second automated activation mode (2), the CPU 11 activates the navigation function if a distance between a present position and a registered destination (position-to-go) reaches at less than a specified distance. Therefore, the navigation function is automatically activated in the vicinity of the destination, and navigation is automatically started.

According to the present invention, only after whether or not a user wishes to activate the navigation function responding to a message displayed on the monitor 20, the navigation function can be automatically activated. Therefore, automated activation of the navigation function is restricted by the user's intension and unnecessary activation can be eliminated.

In the foregoing embodiment, a "specific time-to-return" is specified at steps A11 and A12, however a required time (amount of time) may be set instead of a specific time. That is, an amount of time (time-to-return) when a user should arrive at a destination (position-to-return), like how many hours after a present time (based on a starting time), may be set. In this case, for example, the CPU 11 registers a target time (step A12) in FIG. 5A, RTC 23 or an own timer (software timer) to start counting an elapsed time from that time (step A13). The CPU 11 acquires a time difference between an elapsed time (time counted by a timer) from a start time and a time-to-return in step A38 in FIG. 5C etc., and the navigation function is activated based on a distance and the time difference.

The respective specified values (distances) can be set arbitrarily as required. The user is therefore, enabled to enter and set the values following displayed screen as exemplified in FIG. 6E on the monitor 20. In this case, the CPU 11 stores the entered specified values in the memory 14, and uses them in every step as bases for deciding values.

B. Second Embodiment

According to the first embodiment, the navigation function is activated depending on a relationship between a fixed destination (position-to-return, or position-to-go) and a present position. However, it is not necessary that the destination is fixed, and the destination itself may be movable. For example, the position of a moving object can be the destination.

Accordingly, the second embodiment is described for activating the navigation function based on a relationship between own position and the position of another mobile phone device 1 as a destination.

The same features or elements in the first embodiment are denoted by the same reference numerals to omit unnecessary descriptions. Hereinafter, only features or elements characterized by the second embodiment are described.

The mobile phone device 1 of the second embodiment has two operation modes: including a "missing mode"; and a "meeting mode".

The missing mode automatically activates the navigation function if a distance between two mobile phones departs more than a specified value. The missing mode is useful for a case when the both mobile phone devices 1 automatically activate the navigation functions which navigate a route to a counterpart's mobile phone device 1 to prevent, for example, a child from being got lost if a distance between the mobile phone device 1 owned by a parent and another mobile phone device 1 held by the child departed more than a specified reference distance as exemplified in FIG. 8A.

The meeting mode automatically activates the navigation function if the distance between the two mobile phone devices 1 reaches at less than a specified value. In the meeting mode, for example, when a user is meeting with a family or a friend, as shown in FIG. 8B, by detecting a distance between the own mobile phone 1 and the counterpart's mobile phone 1 reaches at less than a specified distance, the navigation function is automatically activated for the both parties for navigating the each of mobile phones.

As shown in FIG. 9, the address book AD stored in the memory unit 12 of the mobile phone device 1 having information by counterparts and their data, including such as "name of counterpart", "telephone number", "flag of a company person (company flag)". The contents are the information entered by a user as required. "Name of counterpart" and "telephone number" are terminal identification information for identifying a counterpart's mobile phone device 1.

"Flag of company person" indicates a company (to be accompanied) when a parent and a child go out together. For example, as shown in FIG. 9, if "flag of company person" (a round mark) is set relating to "father" in the mobile phone device 1 carried by a child, a route is navigated to arrive at the position thereof by selecting "father" as a counterpart.

Both operation modes can be set, for example, by setting a screen similarly to the setting screen as shown in FIG. 6A for displaying on the monitor 20 to help a user operate depending on the screen.

Next, an operation of the mobile phone device 1 according to the second embodiment is described.

Figure 10A:
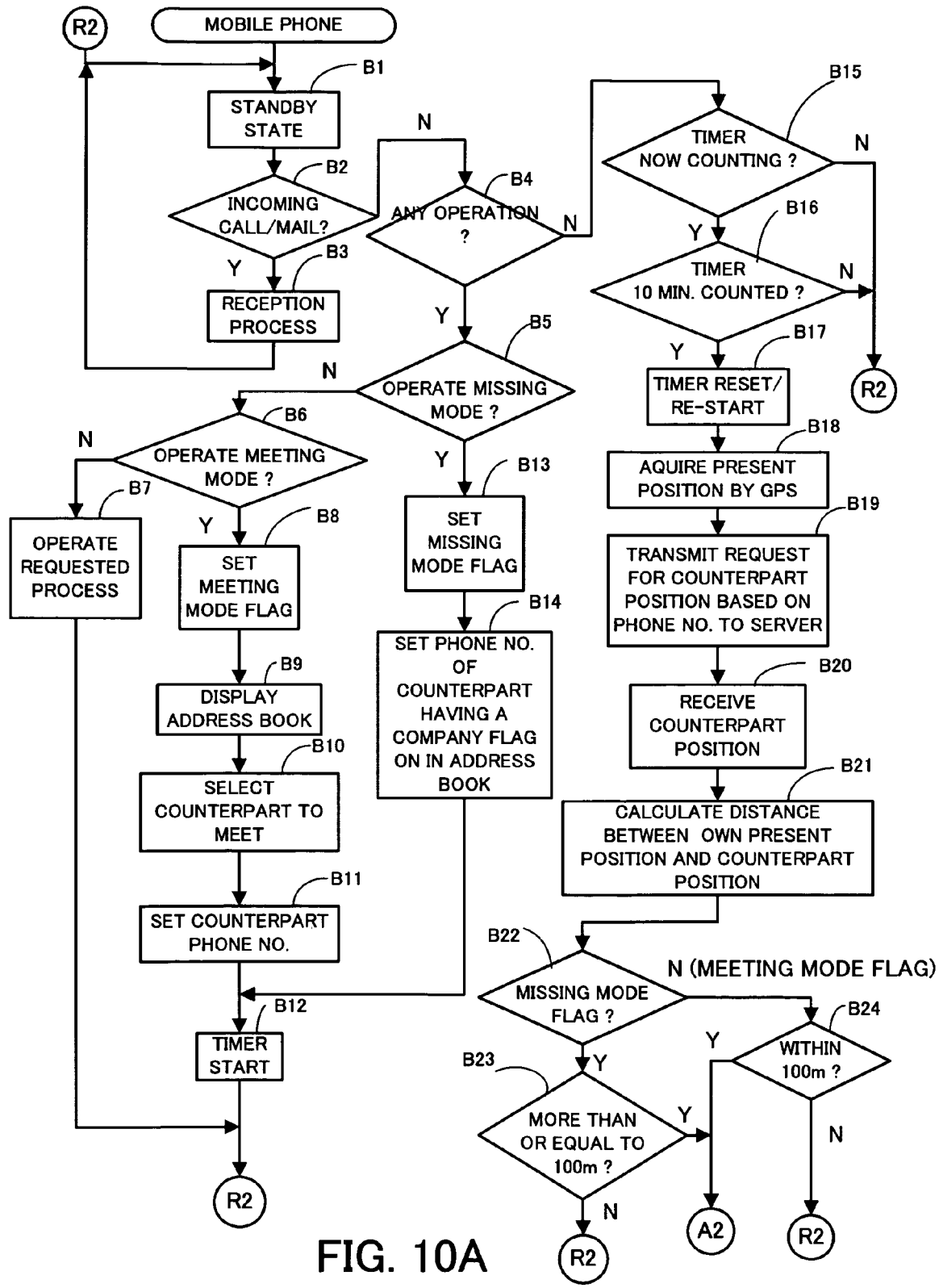
Figure 10B:
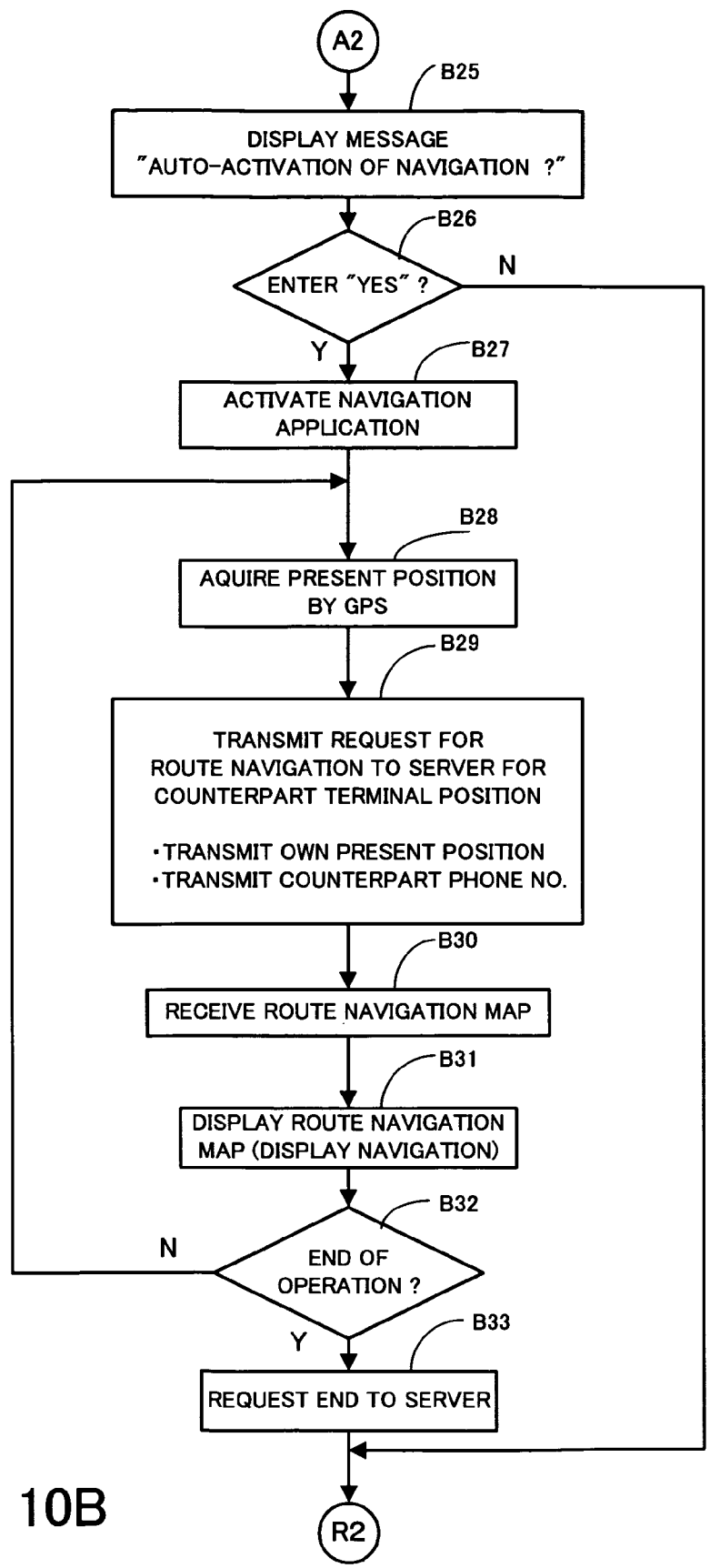

As the power of mobile phone device 1 is turned on, the CPU 11 starts a processing as shown by the flowcharts of FIGS. 10A and 10B.

First, the CPU 11 performs a standby process by activating the telephone communication unit 15 for registering a present position in the management information stored in the management server 3 (step B1). Next, the CPU 11 reads out a specified standby image from the memory 14 and displays it on the monitor 20, and the flow moves to the call/mail waiting state (step B2). If reception of a call/mail is detected (step B2: Yes), the CPU 11 performs a call/mail reception process (step B3). If incoming reception of a call/mail is not detected (step B2: No), the flow moves to step B4 for determining whether or not the user operates the entry unit 21. If a user operates the entry unit 21 (step B4: Yes), the CPU 11 determines if the operation is for selecting the "missing mode" (step B5). If "No" at step B5, the CPU 11 determines if the operation is for selecting the "meeting mode" (step B6). If the operation is other type of operation, the CPU 11 determines "No" (step B6: No), and performs an outgoing telephone process, a mail creation process, etc. corresponding to the operation (step B7), and returns to the standby state.

If the user selects the "meeting mode" by a mode selection operation, the CPU 11 determines "Yes" at step B6, and sets a "meeting mode flag" for setting the "meeting mode" (step B8), reads out the contents of the address book AD, and displays the list of the contents on the monitor 20 (step B9). If the user operates the entry unit 21 to select a meeting person from the list, the CPU 11 identifies the selected counterpart (step B10), reads out the "telephone number" of the identified counterpart, and sets the telephone number in the work area of the memory unit 14 (step B11). Thereafter, the CPU 11 activates the timer (10-minutes timer) in the RTC 23 to start counting for periodically requesting a present position from GPS receiver 22 (step B12), and returns to the standby state (step B1).

If the user selects the "missing mode" by a mode selection operation, the CPU 11 determines "Yes" at step B5, and sets a "missing mode flag" for setting the missing mode (step B13), refers to the address book AD, reads out the "telephone number" of an counterpart whom "flag of company person" is set, and sets the telephone number in the work area of the memory 14 (step B14). Subsequently, the CPU 11 activates the 10-minutes timer to start (step B12), and returns to the standby state (step B1).

If there is a timing of no incoming call or operation, it is determined "No" in step B2 and step B4, and the CPU 11 determines whether or not the 10-minutes timer is in a counting operation (step B15). In a state of "meeting mode" or "missing mode", the 10-minutes timer is activated at step B15 (step 15: Yes), the CPU 11 determines whether or not 10 minutes elapsed (time expired) after the start of the timer operation (step B16). If it is before time expiration (step B16: No), the CPU 11 returns to the standby state at step B1. At the time of time expiration (step B16: Yes), the CPU 11 resets the 10-minutes timer to restart thereof (step B17), and receives a present position (own terminal device position) from GPS receiver 22 (step B18). If "No" at step B15 or B16 (steps B15, B16: No), the flow returns to the standby state at step B1.

Next, the CPU 11 reads out the "telephone number" of the counterpart set in the work area of the memory 14 (step B11 or step B14), and requests the management server 3 to search the counterpart's terminal device position (present position of the counterpart's terminal) based on the read-out "telephone number" (step B19).

Figure 11:
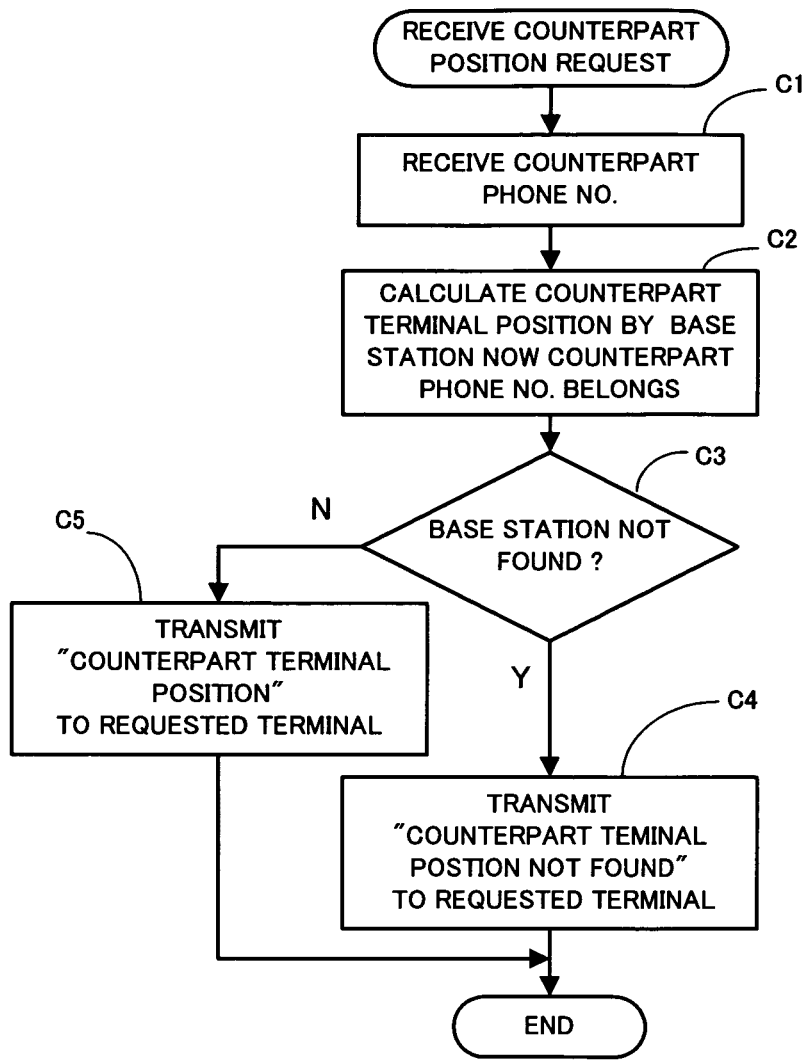
FIG. 11 is a flowchart showing a process performed by the management server when a request for location search is received from a mobile phone.

The CPU 31 of the management server 3 responds to the request, and as shown in FIG. 11, first, receives the "telephone number" of the counterpart sent from the mobile phone device 1 together with the request (step C1), and acquires the present position of a mobile phone device 1 having that "telephone number" (step C2). Specifically, as mentioned before, as shown in FIG. 3B, management information is stored in the data area of the memory 32, one by one. The CPU 31 identifies what area of a base station currently covers the mobile phone device 1 responding to the telephone number, and identifies the position of the base station as the present position of the mobile phone device 1.

The CPU 31 determines whether or not the present position of the counterpart's mobile phone device 1 is specifically identified (step C3).

If the information of the mobile phone device 1 in the particular cell is not registered therein corresponding to the transmitted telephone number (step C3: Yes), the CPU 31 transmits a message back to the mobile phone device requested for the position of the counterpart's terminal was not obtained (step C4).

If the information of the mobile phone devise 1 in a particular cell is registered therein corresponding to the transmitted telephone number (step C3: No), the position of the base station 4 is transmitted back to the mobile phone device 1 requested for the position of the counterpart's terminal (step C5).

The CPU 11 requests the position of the counterpart's terminal to the management server 3 (step B19), and then receives the counterpart's position from the management server 3 (step B20). Subsequently, the CPU 11 calculates a distance (direct distance) between the own position and the counterpart's position (step B21), and determines if the "missing mode flag" is set, (step B22: Yes) or the "meeting mode flag" is set (step B22: No). In case of the "missing mode" where the "missing mode flag" is set (step B22: Yes), the CPU 11 determines whether or not the distance between the own terminal position and the counterpart's terminal position is more than a specified value (e.g., more than 100 m) (step B23). If the distance is less than the specified value (100 m) (step B23: No), the CPU 11 makes the flow return to the standby state (step B1). On the other hand, if the distance is more than the specified value (100 m) (step B23: Yes), the CPU 11 performs the navigation process at step B25 for navigating a route to the counterpart's terminal position.

According to the navigation process of the present invention, the CPU 11 displays a confirmation message as exemplified in FIG. 6D to determine whether or not the user wants to automatically activate the navigation function on the monitor 20 (step B25), and determines whether or not the "Yes" key-button in FIG. 6D for instructing activation (for instructing automated activation) is entered (step B26).

If the "Yes" key-button is not entered (step B26: No), the CPU 11 makes the flow return to the standby state (step B1). If the "Yes" key-button is entered (step B26: Yes), the CPU 11 activates the navigation function (step B27). The CPU 11 obtains a present own position from GPS receiver 22 (step B28).

Subsequently, the CPU 11 requests to transmit a route navigation to the counterpart's terminal position from the own terminal position to the management server 3 together with the own terminal position and the counterpart's counterpart telephone number (step B29). The CPU 31 of the management server 3 performs the route-navigation-request reception process responding to the route navigation request, shown in FIG. 12.

The CPU 11 of the mobile phone device 1 receives a route map from the management server 3 (step B30), and requests the monitor 20 to output the route map (step B31). It is preferred that the route map should be displayed in an animated manner so as to a little child can easily understand a route from the present position to the counterpart's position. The process returns to step B28 until an operation of terminating the navigation is carried out (step B32: No), and the foregoing operation is repeated while sequentially transmitting an own position while it changes by every second. If termination of the navigation is instructed, the CPU 11 detects the instruction (step B32: Yes), and transmits a navigation termination request to the management server 3 (step B33).

Figure 12:
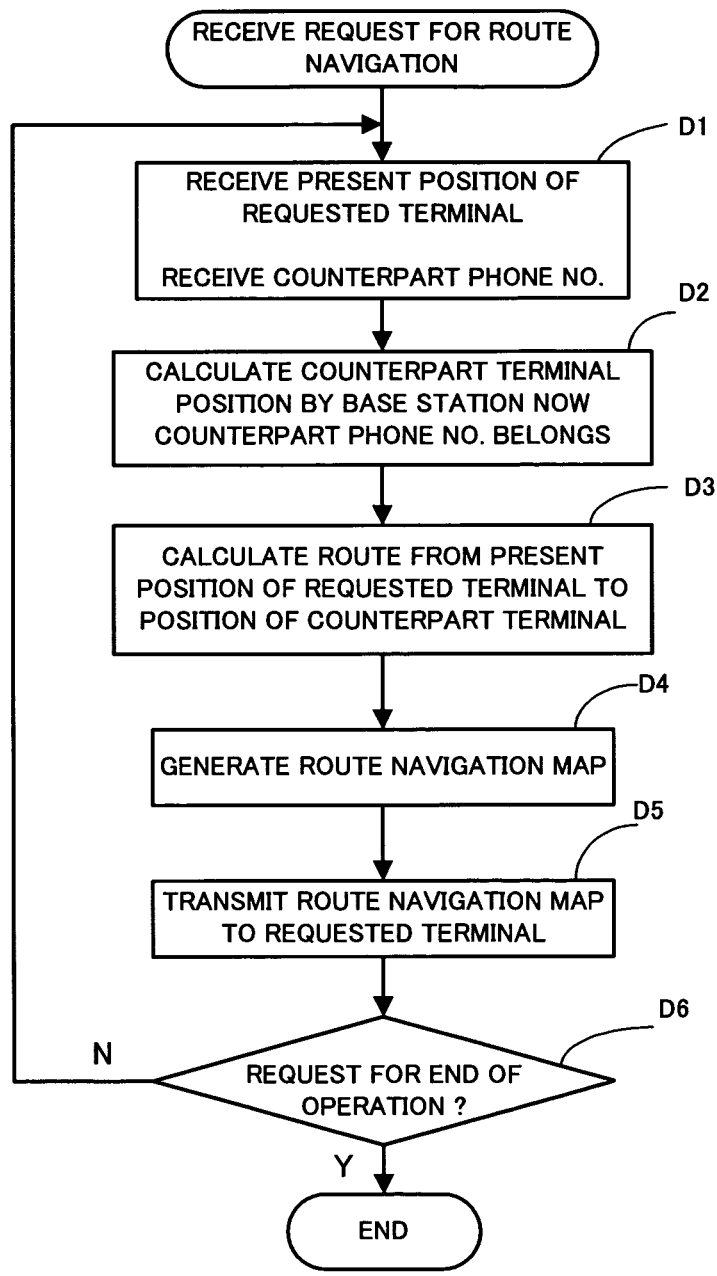
FIG. 12 is a flowchart showing a process performed by the management server when a request for a route navigation is received from a mobile phone.

Next, referring to FIG. 12, operation of the CPU 31 of the management server 3 is described when a route navigation request is received from the mobile phone device 1.

First, the CPU 31 receives the present position of the mobile phone device 1 originated the request and the telephone number of the counterpart (step D1), and obtains the present position (cell) of the counterpart's terminal based on the "telephone number" from the fact that the "telephone number" of the counterpart's terminal is registered in any one of the base stations (step D2). Next, the CPU 31 calculates the most suitable distance between the present position of the mobile phone device 1 who originated the request and the present position of the counterpart (step D3), creates a route map from the present position of the mobile phone device 1 who originated the request and the present position of the counterpart (step D4), and transmits the route map to the mobile phone device 1 who originated the request (step D5). Thereafter, the CPU 31 generates a new route map from positional information while it changes every second and sequentially transmits thereof (step D6: No) to the mobile phone device 1 (originator of the request) until the request for termination is received (step D6: Yes) for terminating the navigation from the originator.

Return to FIG. 10A, in a case of the "meeting mode" where the "meeting flag" is set at step B22 (B22: No), the CPU 11 determines if a distance between the own terminal position and the counterpart's terminal position is less than a specified distance (e.g., within 100 m) (step B24), if it exceeds 100 m (step B24: No), the CPU 11 makes the flow return to the standby state at step B1. If it is within 100 m (step B24: Yes), the CPU 11 performs a navigation process of navigating a route to the counterpart's terminal position based on steps B25 through B32, on condition that the user acknowledges its activation. In this case, similarly to the foregoing "missing mode", the navigation function is activated on condition that the confirmation of the user (step B27) in FIG. 10B, and the own present position is obtained from GPS receiver 22 (step B28), and a route map transmitted from the management server 3 in response to a route navigation request received and displayed following steps B29 through B31.

In the second embodiment, the CPU 11 acquires a distance between the counterpart's terminal position and the own terminal position, activates the navigation function (navigation program) depending on the acquired distance, and starts navigating a route from the own terminal position to the counterpart's terminal position. Therefore, the navigation function is automatically activated at a suitable timing based on the positional relationship between the own position and the counterpart's position, so that the navigation function is not activated before it is necessary. Moreover, the second embodiment of the invention makes the navigation feature possible to use by a child and an old person who are not friendly with the operation.

The mobile phone device 1 displays a message for requesting the necessity of activation of the navigation function prior to activation of the navigation function, and activates the navigation function when the user instructs activation thereof. Therefore, it is possible to reflect the user's intension in activation of the navigation function, and unnecessary activation can be avoided.

In the "missing mode", the mobile phone device 1 activates the navigation function if a distance between the own terminal position and the counterpart's terminal location reaches at larger than a specified distance. Thus, it is useful for a case where a child is got lost when a parent goes out together with the child. The navigation function is used only when the mobile phone device 1 is departed a certain distance from the counterpart's mobile phone device 1, so that if the navigation function is activated on condition that the mobile phone device 1 is departed from the counterpart's mobile phone device 1, the navigation function can be automatically activated at a suitable timing, and even if an unexpected case like a child got lost, it is possible to provide guiding navigation certainly and quickly.

In the "meeting mode", the mobile phone device 1 activates the navigation function if a distance between the own terminal position and the counterpart's terminal position reaches at smaller than a specified distance. Therefore, in a case of a family, a friend, etc. is meeting as a counterpart to meet; it is possible to provide navigation to the meeting counterpart. Further, the navigation function is automatically activated only when the mobile phone device 1 is positioned closer between them. Therefore, the navigation function is automatically activated at a suitable timing, thereby providing certain and quick guiding navigation.

According to the second embodiment, a route map to a counterpart's position is acquired depending on a positional relationship with the counterpart's terminal position and displayed, if the route map is sent to the counterpart's terminal device and displayed, only when both users come closer while viewing the respective terminal screens, and can have them meet efficiently.

According to the second embodiment, a route to a counterpart's position is navigated depending on the positional relationship between the own terminal position and the counterpart's terminal position, and further, a distance therebetween may be acquired, and an estimated time to be required from the own 1 terminal position to the counterpart's terminal position may be acquired based on the acquired distance and a walking speed, and the estimated time to be required may be provided together with a route navigation.

According to the second embodiment, a distance between a own terminal position and a counterpart's terminal position, and the specified distance (100 m) may not be fixed values, but may be any values which can be arbitrarily set. For example, the distance may be set by displaying a screen as shown in FIG. 6E on the monitor 20.

The present invention is not limited to a mobile phone device having a navigation function, but can be applied to other terminal devices, such as a PDA (Personal Digital Assistance), an electronic camera, an electronic wrist watch, a music reproduction device, and a car navigation system, having a navigation function.

A distance between a present position and a destination, and a moving time may be calculated based on not only a direct distance, but also the height of an actual mountain or hill, a road, etc. from map data and road data.

In the foregoing embodiments, each mobile phone device 1 detects an own position, and the management server 3 generates map information and route information, but each mobile phone device 1 may store map information beforehand, and may display a map for navigation.

The mobile phone device 1 may receive GPS signals, transmit a reception parameter to the management server 3, and the management server 3 may obtain the position of the mobile phone device 1 based on the received reception parameter, and transmit information on the obtained position to the mobile phone device 1.

While the present invention has been described with reference to the preferred embodiments, it is intended that the invention be not limited by any of the details of the description therein but includes all the embodiments which fall within the scope of the appended claims.

The present application is based on Japanese Patent Application No. 2007-037405 filed on Feb. 19, 2007, the entire disclosure of which hereby incorporated by reference.

What is claimed is:

1. A terminal device comprising:
a positional information acquisition unit which acquires positional information indicating a position of the terminal device;
a destination information acquisition unit which acquires destination information specifying a destination;
a navigation unit which acquires from a server, upon activation, data indicating a route from a position specified by the positional information acquired by said positional information acquisition unit to a destination specified by the destination information, and which navigates the routes;
a distance acquisition unit which acquires a distance between the position specified by the positional information acquired by said positional information acquisition unit and the destination specified by said destination information;
a determining unit which repetitively determines whether or not the distance acquired by said distance acquisition unit is larger than a specified value; and
an activation control unit which waits without activating said navigation unit until the determining unit determines that the distance is larger than the specified value, and activates said navigation unit to start navigation of the route from the position of the terminal device to the destination when the determining unit has determined that the distance is larger than the specified value,
wherein the destination information acquisition unit includes:
a counterpart information memory unit which stores counterpart information for each counterpart, and
a reception unit which receives, from the server, information specifying a position of a terminal device of a counterpart as the destination information, the counterpart being selected from among counterparts whose counterparts whose counterpart information is stored in the counterpart information memory unit,
wherein the activation control unit displays, on a monitor of the terminal device a route from the position of the terminal device to the position of the terminal device of the selected counterpart;
wherein data is sent from the server to the terminal device of the selected counterpart, the sent data being the same as the data indicating the route acquired by the navigation unit, and
wherein the terminal device of the selected counterpart displays, on a monitor of the terminal device of the selected counterpart, the route indicated by the data received from the server, the route displaced by the terminal device of the selected counterpart being the same as the route displayed by the activation control unit.

2. The terminal device according to claim 1, wherein said navigation unit navigates at least either at least one of routes from a present position to a destination, or an estimated time required to go to the destination from the present position.

3. The terminal device according to claim 1, wherein:
said destination information acquisition unit has a return position registration unit which registers a position-to-return where a user should return to, which is a present position indicated by the positional information acquired by said positional information acquisition unit, as the destination; and said activation control unit activates said navigation unit when said determining unit has determined that a distance between the position-to-return and a present position indicated by the positional information acquired by said positional information acquisition unit after the position-to-return is registered as a destination by said return position registration unit is larger than the specified value.

4. The terminal device according to claim 1, further comprising:
a clock unit which counts a time;
a target arrival time memory unit which stores a target arrival time when to arrive at a destination; and
a time difference acquisition unit which acquires a time difference between a time acquired by said clock unit and a target arrival time stored in said target arrival time memory unit; wherein
said activation control unit activates said navigation unit depending on a distance acquired by said distance acquisition unit and a time difference acquired by said time difference acquisition unit.

5. The terminal device according to claim 4, wherein said activation control unit activates said navigation unit when a distance acquired by said distance acquisition unit reaches a first specified value and a time difference acquired by said time difference acquisition unit reaches a second specified value.

6. The terminal device according to claim 1, further comprising:
a target arrival time memory unit which stores a target arrival time that is a target value of a time required until a user arrives at a destination;
a clock unit which counts an elapsed time; and
a time difference acquisition unit which acquires a time difference between a time stored in said target arrival time memory unit and a time counted by said clock unit, wherein
said activation control unit activates said navigation unit when a distance acquired by said distance acquisition unit reaches a first specified value and a time difference acquired by said time difference acquisition unit reaches a second specified value.

7. The terminal device according to claim 1, wherein
said activation control unit activates said navigation unit when said determining unit has determined that a distance between a position of the terminal device of the selected counterpart and a present position indicated by the positional information acquired by said positional information acquisition unit is larger than the specified value.

8. The terminal device according to claim 1, further comprising:
a condition-completion determining unit which determines whether or not a specified condition set beforehand is satisfied, wherein
said activation control unit activates said navigation unit based on a distance acquired by said distance acquisition unit and a result of the determination by said condition-completion determining unit.

9. The terminal device according to claim 1, further comprising:
a condition-completion determining unit which determines whether or not a specified operation is performed, wherein
said activation control unit activates said navigation unit based on a distance acquired by said distance acquisition unit and a result of the determination by said condition-completion determining unit that the specified operation has been performed.

10. The terminal device according to claim 1, wherein said activation control unit has a message output unit which outputs a message for inquiring necessity of activation of said navigation unit before said navigation unit is activated, and activates said navigation unit in response to an activation instruction by a user via an input unit.

11. A nontransitory recording medium in which a program is recorded, the program allowing a computer to perform:
   a positional information acquisition step of acquiring positional information indicating a position of the terminal device;
   a destination information acquisition step of acquiring destination information specifying a destination;
   a distance acquisition step of acquiring a distance between the position indicated by the positional information and the destination indicated by the destination information;
   a determination step of repetitively determining whether or not the distance is larger than a specified value; and
   an activation control step of waiting without activating a navigation unit which acquires from a server data indicating a route from the position indicated by the positional information to the destination specified by the destination information and which navigates the route until it is determined that the distance is larger than the specified value, and activating the navigation unit to start navigation of the route from the position of the terminal device to the destination when it has been determined that the distance is larger than the specified value,
   wherein in the destination information acquisition step:
      information specifying a position of a terminal device of a counterpart is received from the server as the destination information, the counterpart being selected from among counterparts whose counterpart information is stored in a memory unit which stores counterpart information for each counterpart;
      wherein the activation control unit displays, on a monitor of the terminal device a route from the position of the terminal device of the selected counterpart is displayed on a monitor of the terminal device;
   wherein data is sent from the server to the terminal device of the selected counterpart, the sent data being the same as the data indicating the route acquired by the navigation unit; and
   wherein the terminal device of the selected counterpart displays the route indicated by the data received from the server, the route displayed by the terminal device of the selected counterpart being the same as the route displayed in the activation control step.

12. The terminal device according to claim 7, wherein
   the counterpart information includes information indicating whether or not the counterpart is a company to which a route is navigated when a distance between a user and the counterpart departs more than the specified value, and
   said reception unit selects a counterpart set as a company from among counterparts whose counterpart information is stored in said counterpart information memory unit and receives information specifying a position of a terminal device of the selected counterpart, as the destination information.

* * * * *